United States Patent [19]

Worley

[11] 4,317,798
[45] Mar. 2, 1982

[54] BOTTOM (COKER) BURNER VESSEL

[75] Inventor: Arthur C. Worley, Mt. Tabor, N.J.

[73] Assignee: Exxon Research & Engineering Co., Florham Park, N.J.

[21] Appl. No.: 173,474

[22] Filed: Jul. 30, 1980

[51] Int. Cl.³ .......................... F27B 15/10; B01J 8/44
[52] U.S. Cl. .................................. 422/144; 208/127; 208/153; 208/163; 252/411 R; 422/143; 422/147; 431/7; 432/15; 432/58
[58] Field of Search ...................... 422/143, 144, 147; 208/127, 153, 163; 252/411 R; 432/15, 58, 72; 431/7

[56] References Cited

U.S. PATENT DOCUMENTS

| | | | |
|---|---|---|---|
| 2,654,659 | 10/1953 | Friedman | 422/143 |
| 2,816,011 | 12/1957 | Trainer et al. | 422/144 |
| 2,881,130 | 4/1959 | Pfeiffer et al. | 208/127 |
| 2,881,133 | 4/1959 | Whiteley et al. | 422/141 X |
| 3,016,624 | 1/1962 | Bliss | 422/143 X |
| 3,092,468 | 6/1963 | Slyngstad et al. | 422/144 |
| 3,215,508 | 11/1965 | Piester | 422/143 |
| 4,051,013 | 9/1977 | Strother | 208/153 X |
| 4,101,288 | 7/1978 | Smith et al. | 422/144 |
| 4,226,830 | 10/1980 | Davis | 422/143 |

FOREIGN PATENT DOCUMENTS 1280442  2/1961  France ............................. 422/143

*Primary Examiner*—Barry Richman
*Attorney, Agent, or Firm*—F. Donald Paris; Robert S. Salzman

[57] ABSTRACT

A burner vessel or regenerator vessel is disclosed which has an elliptical bottom head which supports a particulate refractory fill which in turn supports and stabilizes an air distributor inlet manifold. The manifold is supported at radially arranged distribution pipes so that the main air header floats freely for expansion and contraction. A fluidized bed of particulate is combusted above the refractory fill layer. Other appropriate operation apparatus for the vessel are also disclosed. The burner vessel is used in a fluid coker apparatus and the regenerator vessel is used in a fluid catalytic cracking unit.

11 Claims, 8 Drawing Figures

BOTTOM (COKER) BURNER VESSEL

BACKGROUND OF THE INVENTION

A. Field of the Invention

This invention relates to apparatus for the production of particulate coke stock and distillate stock from heavy petroleum residiums which have previously been economically unattractive for recovery and refining. The increasing price of fuel products and world fuel shortages have made it imperative to produce fuels from these sources.

Heavy petroleum residiums are refined by passing the residiums through a fluid coker apparatus which consists essentially of a reactor vessel and a burner vessel. The residum is sprayed into the interior of the reactor vessel from a plurality of points. The interior of the reactor vessel is supplied with a fluidized bed of particulate coke which is maintained at elevated temperatures. The residium contacts this hot coke and is broken into volatile fractions and non-volatile fractions. The volatile fraction rises to the surface of the fluidized bed of coke and is passed through a separatory and fractionating apparatus at the top of the reactor vessel. The separatory apparatus scrubs the volatile fraction and removes particulate material before passing the volatile fraction to the fractionating apparatus. The volatiles are condensed in this latter section and are removed from the reactor as distillate stock. The distillate stock can be refined into various grades of motor fuels, but that aspect of the refinement process does not constitute a part of the present invention.

The non-volatile fraction of the contacted residium condenses on the hot, particulate coke in the fluidized bed of the reactor vessel. The non-volatiles coat the coke particles with a new and increasing dimension of coke product. The coke particles grow in size from an original "seed" particle size, as they are introduced to the reactor vessel initially, to a maximum fluid coke size, as they achieve upon being coated with non-volatile residium product. The maximum particle size can vary and is set by calibration of the discharge line from the reactor vessel, wherein a separatory device, such as a cyclone separator will distinguish between particles of coke which have "grown" or achieved the maximum dimension and those that have not achieved that dimension. Under-sized particles are returned to the fluidized bed of the reactor vessel for further treatment, while coke particles of the maximum desired size are discharged to the burner vessel of the fluid coker apparatus, or directly to storage.

The burner vessel is a second fluidized bed of particulate coke. This fluidized bed is maintained several hundred degrees in temperature above the bed of the reactor vessel. It is kept at such elevated temperatures (1000 F.-1500 F.) by the combustion of a portion of the particulate coke feed in its fluidized bed. This combustion is initiated by an auxiliary burner which supplies heated gases at initial start up of the fluid coker apparatus, but burner vessel temperatures are thereafter maintained simply by providing a combustion supporting gas, such as air, to the already hot particulate coke in the fluidized bed of the burner vessel.

Some of the hot combusted coke particles are metered back to the reactor vessel to complete the cyclic flow of coke to and from the reactor vessel and the burner vessel and to maintain the residium coking temperatures in the reactor vessel. The remaining surplus of particulate coke is discharged from the top of the fluidized bed of the burner vessel and quenched with a coolant, such as water, before being transported to a storage facility. The structure and arrangement of the burner vessel is of critical importance to the operation of the fluid coking apparatus in light of the extremely high temperatures maintained in the burner vessel, the corrosive, oxidative conditions inherent in such a vessel and the need to maintain a calibrated flow of particulate coke through the vessel. In addition, the operation of the apparatus should maximize its economical operation in order to maintain the favorable recovery of the residium raw stock.

The subject apparatus may also find application as a regenerator for a catalytic cracking unit which combusts the coke coated upon the catalyst particulate in a fluidized bed.

B. The Prior Art

The prior art has provided operational fluid coking devices of acceptable capability in which a circulating flow of coke is maintained between a reactor vessel and a burner vessel. However, the prior art burner vessels have not maximized the efficiency of said apparatus with respect to volume and materials used in the burner vessel.

In U.S. Pat. No. 2,881,130 to Pfeiffer et al. a fluid coker apparatus is shown which has a burner vessel of generally cylindrical design. The entire lower portion of the vessel contains the fluidized bed, which subjects the various stand pipes to the aggressive environment of the bed. The vessel has a generally conical bottom head or floor. In addition, the fluidizing fuel-air delivery pipe has only a central discharge point.

In U.S. Pat. No. 2,881,133 to Whiteley et al. a similar fluid coker apparatus is described. Again, the burner vessel has a deep conical bottom head or floor, and the standpipes are directly in contact with the fluidized bed without additional support. The air discharge and fluidization inlet has only a central, covered discharge port.

These characteristics of the prior art provide limitations on the efficient, economical operation of a burner vessel in a fluid coker apparatus in which only nominally recoverable residiums are processed. With a view toward improving on the efficiency and economy of the prior art burner vessels of fluid coker apparatus and the production of profitable residium products, the present invention contemplates several novel advances in burner vessel design which provide efficient, economical operation.

SUMMARY OF THE INVENTION

The present invention is directed to an improved design for a burner vessel of a fluid coker apparatus or a distributor in a regenerator of a fluid catalytic cracking unit. The burner vessel has an elliptical bottom head which maximizes interior volume of the vessel, reduces the overall height of the vessel while minimizing the necessary length of standpipes and their supports in the bottom of the vessel. The burner vessel also has an air distributor inlet which consists of a central air header which projects vertically through the bottom head and has a number of delivery pipes radiating horizontally from the top of the header. The delivery pipes are interconnected by a series of concentric ring delivery pipes which discharge the fluidizing gas for the burner vessel. The air distributer inlet is supported only at is radial delivery pipes in order to provide for thermal expansion and contraction of the pipes. The central air header is connected to the vessel shell by a bellows device which allows for differential thermal movement of the inlet header and the vessel head.

The burner vessel has a large-aggregate, refractory fill in the lowermost portion of the vessel, which insulates the bottom head, keeps the air distributer centralized, stays the standpipes in the bottom head and supports the fluidized bed. The burner vessel structure manifests the objectives set forth below.

It is an object of the present invention to provide a burner vessel of reduced outside dimension, but which has a maximum interior volume.

It is an object of the present invention to provide a mounting for the air distributer radial and concentric delivery pipes and inlet header to allow for unrestrained radial thermal movement and differential bottom head to inlet vertical movement i.e. floating.

It is an object of the present invention to insulate the bottom head, stabilize the various standpipes, and structural members, and provide a flat internal floor surface for the fluidized bed by utilizing a refractory fill in the burner vessel which is of less overall weight than a comparable sand fill.

These and other objects are obtained in the invention as shown in the drawings which are identified below and the detailed description which follows.

DETAILED DESCRIPTION OF A PREFERRED EMBODIMENT

Figure 1:
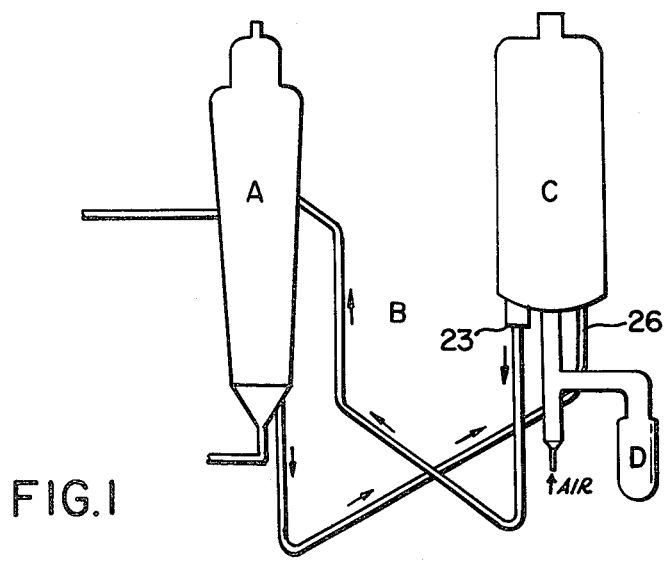
FIG. 1 is a diagramatical view of a fluid coker apparatus and the burner vessel of the present invention.

Referring to FIG. 1, there is shown a typical fluid coker apparatus in which the burner vessel of the present inventon is utilized. The apparatus includes a reactor vessel A which is connected by means of appropriate circuitous conduits B to the burner vessel C.

Figure 2:
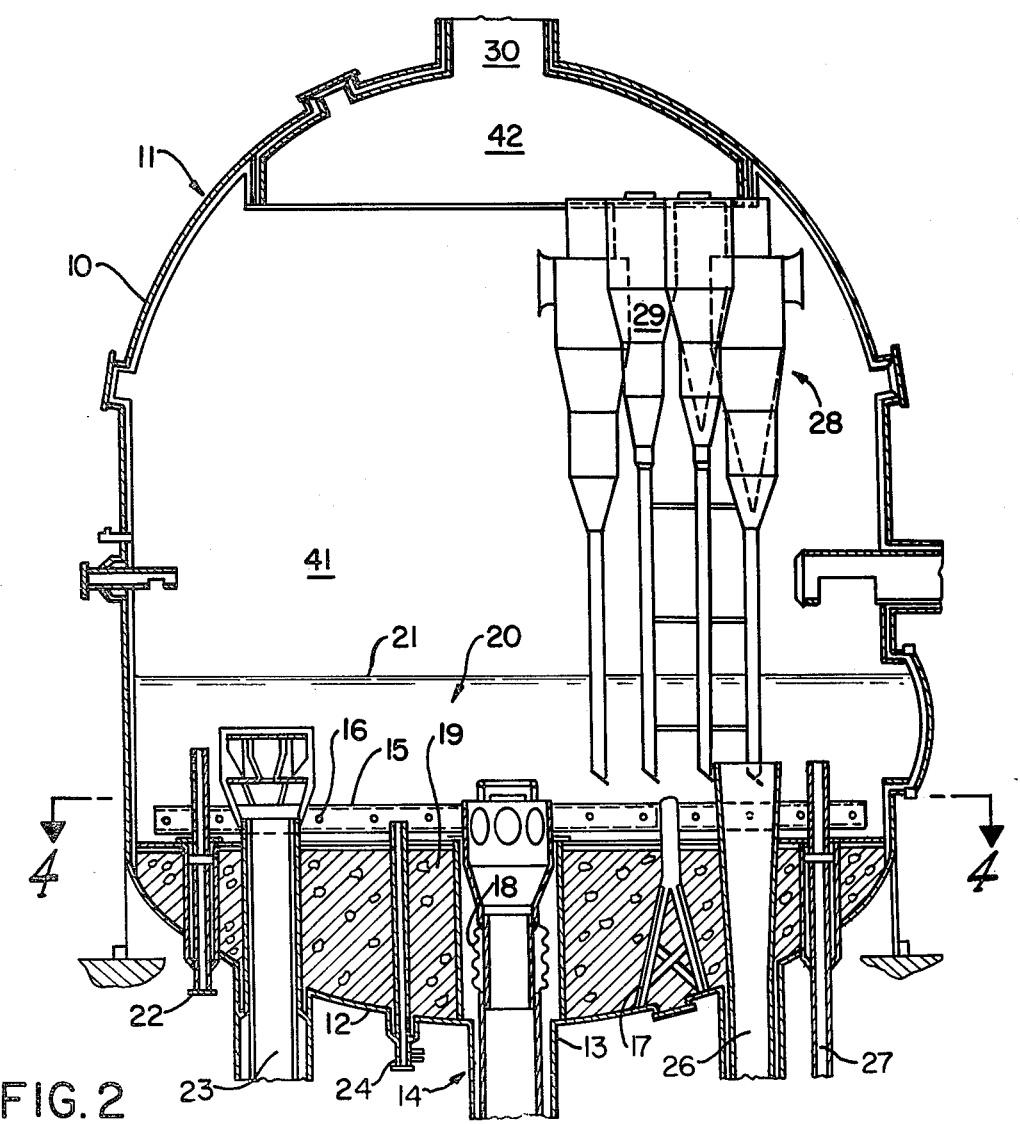
FIG. 2 is a cross-sectional view taken along the vertical axis of the burner vessel depicted in FIG. 1.

The burner vessel of FIG. 1 is shown in greater detail in FIG. 2 wherein the burner vessel has a metallic shell 10. The shell 10 has a hemispherical top head 11 which constitutes the cover of the vessel, and an elliptical bottom head 12 which constitutes the floor of the vessel.

The burner vessel is serviced by appropriate inlets and outlets, including an air distributer inlet 14, and elutriator feed standpipe 22, a cold coke riser 23, a coke unloading nozzle 24, a hot cake standpipe 26, a scouring coke standpipe 27, and an exhaust gas outlet 30. Scouring coke is used for scouring the inlet to cyclone separators 29 in the reactor. Its purpose is to keep the inlet free of coke deposits by ionic effect and/or added heat at the cyclone inlets. The air distributor inlet 14 consists of a vertical air header pipe 13 which passes through the central, axial region of the bottom head 12. A plurality of radial delivery pipes 15 are joined to the header 13 at the point at the lower level of the fluidized bed of the burner vessel. The radial delivery pipes 15 lie in the horizontal plane. A plurality of concentric ring delivery pipes 16 intersect with each of the radial delivery pipes 15 as will be described in greater detail later.

A closed plenum chamber 42 is arranged at the top of the burner vessel just below the exhaust gas outlet 30. This chamber communicates with the freeboard 41 above the fluidized bed through a separatory device 28 which may include one or more centrifugal cyclone separators 29. Preferably, a two-stage, primary-secondary cyclone arrangement is used. This device assures that gases emanating from the burner vessel will reduce coke content (produced in the reactor) as a particulate pollutant and as a loss of the fluid coke product being combusted in the burner vessel.

The elliptical bottom head 12 of the vessel is provided with a layer of large-aggregate, crushed refractory fill 19 or a lightweight refractory cast in place. The term large-aggregate denotes the relative size of the crushed refractory which is considerably large than a sand fill material or a finely ground refractory which latter materials would closely pack and increase the amount of fill required. The crushed refractory fill 19 is supplied to a depth just below the deliver pipes 15, 16 of the air distributor inlet 14. The refractory fill 19 provides horizontal stability for the various standpipes and conduits intersecting the bottom head as well as provide stability to the structural members 17 attached to the bottom head 12. The refractory also isolates the major portion of said standpipes, conduits and structural members from the aggressive environment of the vessel's fluidized bed including the turbulent currents, the elevated temperatures and the corrosive by-products produced during the coke combustion process. Because of the combination of the sloping interior of the bottom head 12 and the loose pack of the large-aggregate refractory material, the refractory fill also tends to keep the central air header 13 centered in the axial region of the burner vessel. This loose pack and large-aggregate nature of the refractory fill reduces the total weight subjected by the fill against the bottom head 12 in comparison to other fills such as sand or other fine materials. The refractory performs the functions of a base for the fluidized bed of particulate coke, as well as providing a flat internal surface during shutdown and operation servicing of the vessel by personnel.

Figure 3:
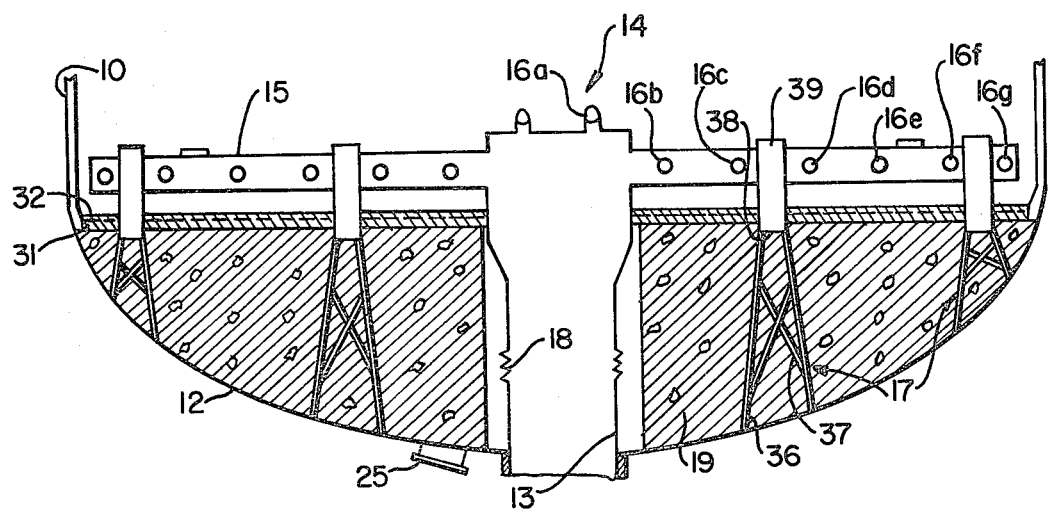
FIG. 3 is a partial cross-sectional view of FIG. 2 showing greater detail of the air inlet header and distributor support structure.

As shown in FIG. 3, the refractory fill is lined with a cast refractory seal layer 31 on the fill's upper surface to prevent the intermingling of coke particles in said fill. The cast refractory is, in turn, reinforced with a metallic mesh 32 embedded in the top surface of the cast layer 32.

Also shown in FIG. 3 are the support members 17 for the air distributor inlet 14. Two such support members are utilized for each radial delivery pipe 15. These support members constitute the sole means of support for the entire inlet 14. This support design allows the inlet 14 and radial pipes 15 and concentric rings 16 to move within the burner vessel and radially expand or contract freely due to thermal effects by sliding contract with the structural supports 17 within the fluidized coke particle bed 20. A yieldable connection 18 arrangement described in greater detail later assists in absorbing movement of 14 in the vertical direction.

Figure 4:
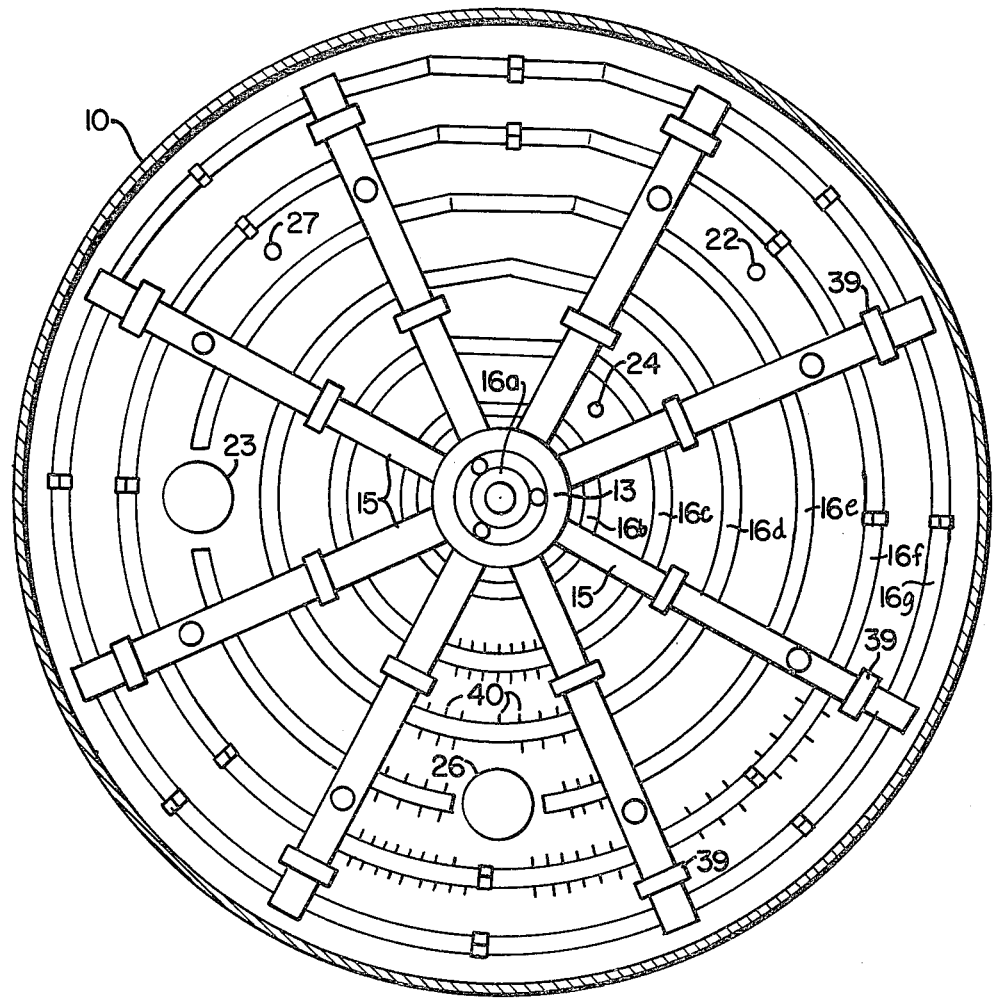
FIG. 4 is a plan view section of the burner vessel of FIG. 2 taken along the line 4—4.

The air distributor inlet is shown in FIG. 4 wherein each of the eight radial delivery pipes 15 are positioned about the central air header 13 similar to the spokes of a wheel. These pipes 15 supply pressurized air or an air/steam mixture to six concentric ring delivery pipes 16 from the central air header 13. Steam can also be supplied through air header 13 for the purpose of maintaining fluidization of the coke particle bed during the period when coke circulation between the reactor and burner is shut off. During periods when coke circulation is shut off between the burner and reactor, steam or steam/air mixture is injected into the distributor to maintain fluidization and to prevent coke back flow into the distributor. The steam is injected into the air line outside of the burner vessel and this can cause condensation of steam in the air line. To prevent thermal shocking of the distributor 11 when full air flow is re-established; steps must be taken to drain all condensate from the air line during the period when steam is injected. If not properly drained, liquid condensate will be injected into the distributor with the air flow and cause severe thermal shock and possible failure of the distributor. The concentric ring delivery pipes 16 are of increasing dimension both in arc length and in cross-sectional diameter, one pipe from the other, from the center of the inlet radially outward. This dimension change is necessary in order to provide equivalent volumes of fluidizing and combusting air to all parts of the bed 20. The outer ring delivery pipes 16 cover a greater overall area than the inner ring delivery pipes 16. In a prefered structural arrangement, the ring delivery pipes are paired dimensionally so that the innermost pipes 16a, 16b, and 16c are of equal diameter (6"), the middle pipes 16d and 16e are of matched diameter (8") and the outermost pipes 16f and 16g are also of matched diameter (10").

Figure 8:
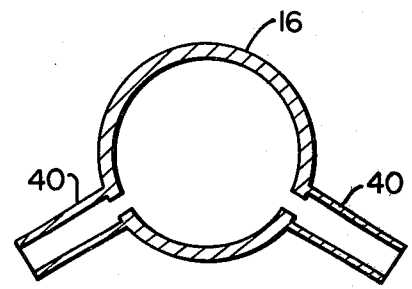
FIG. 8 is a cross-sectional view of the air nozzles of the air distributor pipe ring sections shown in FIG. 4.

Each ring delivery pipe has a plurality of downwardly depending air nozzles 40 which direct the air or steam/air mixture angularly downward at the base of the fluidized bed 20. This downward delivery of the fluidizing air prevents backflow of particulate coke into the air distributor inlet 14 at times of low pressure and also prevents attrition of the fluidized bed 20 at the discharge point of said nozzles 40. The nozzles are shown in greater detail in FIG. 8 where their arrangement consists of paired short length pipes welded to the ring delivery pipes at spaced intervals. The nozzles 40 are directed downwardly at an angle of 30° from the horizontal.

During startup and operation of the burner vessel, temperature fluctuations can create stress in the vessel components due to the differential expansion or contraction of the components. Such stress is particularly critical in the air distributor inlet 14 which consists of a complex array of rigidly fixed pipes. These pipes are also carefully arranged in the fluidized bed in order to provide balanced fluidization and to prevent slumping of the bed in localized areas. It is important to maintain the integrity of the pipes and their balanced position by operating the distributor so that imbalance is minimized. The air distributor must be operated at design air rates to ensure that adequate fluidization of the coke particle bed is achieved. This is important since improper fluidization can cause non-uniform temperature distribution to be imposed on the air distributor and this can result in high stresses of the relatively rigid distributor structure.

Figure 5:
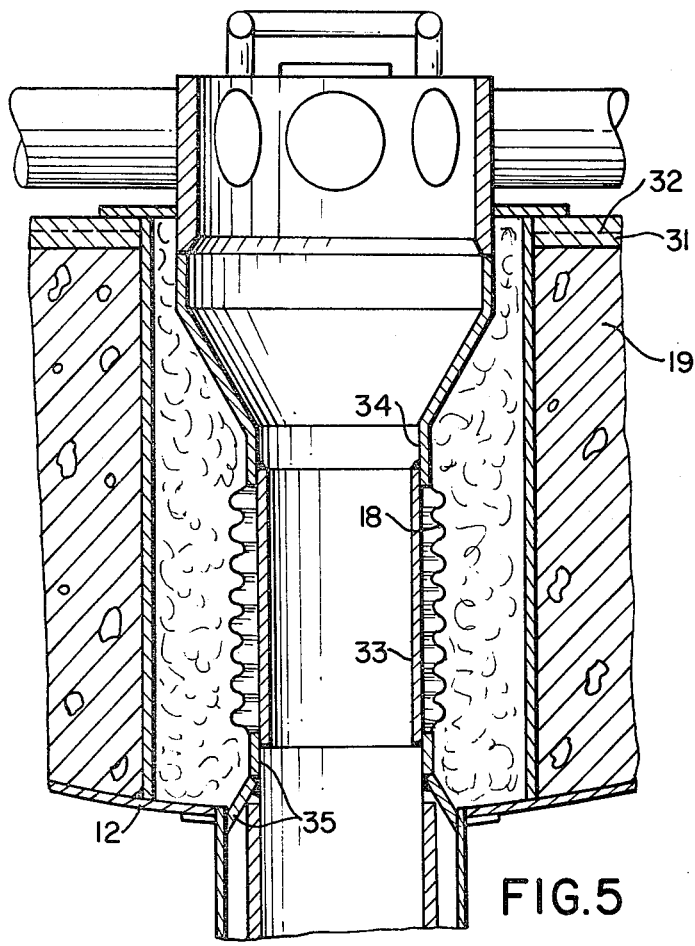
FIG. 5 is a detailed partial cross-sectional view of the central air inlet header and bellows inside the burner vessel as an enlargement of that shown in FIG. 3.

In order to provide some freedom of movement between the vessel shell 10 at the bottom head 12, the central air header 13 of the inlet system is slidingly affixed to the head 12 by a yieldable connection, such as a bellows 18, and an inner slide sleeve 33 assembly, as shown in FIG. 5. The central air header 13 comprises; an upper air header pipe 34 which is affixed to the upper end of the convoluted sheet bellows 18, a frictionally fitted inner slide sleeve 33 and a lower air header pipe 35, which is rigidly affixed to the bottom head 12. The lower air header pipe 35 is affixed to the lower end of the bellows 18 and is in sliding engagement with the inner slide sleeve 33. The slide sleeve is welded to the inside of the upper air header pipe 34 so that sliding engagement occurs only at the lowermost fit of the sleeve 33. The welded bellows 18 assures an air-tight fit in the central air header 13. With this arrangement of components the air distributer inlet apparatus 14 "floats" by its radial delivery pipes 15 and their supports 17. In fact, these supports are anchored to the bottom head 12, but the reduced dimension of each support member 17 and their placement along the length of the radial delivery pipes 15 provides greater freedom of movement in the vertical direction than would be available if the central header, with its great mass and rigidity, were welded or securely affixed to the bottom head.

Figure 6:
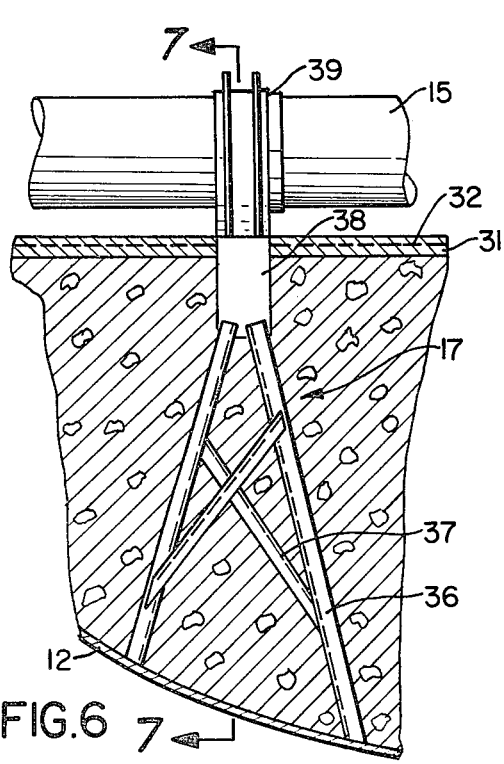
FIG. 6 is a partial detailed view of one of the air distributer radial support members shown in FIG. 3.
Figure 7:
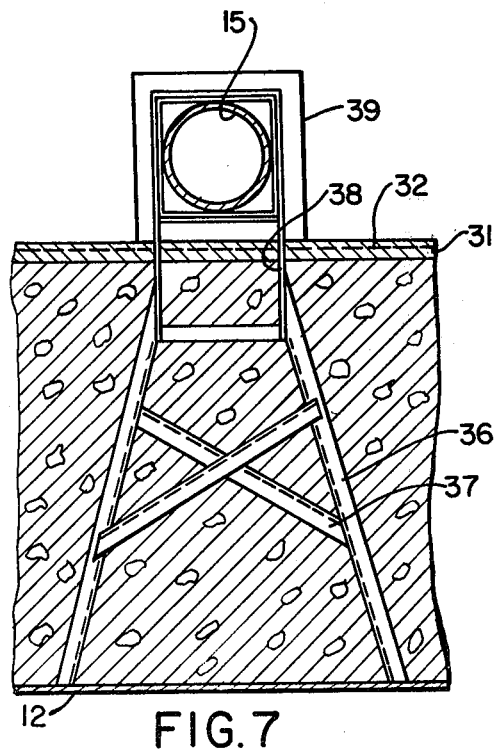
FIG. 7 is a partial detailed cross-sectional view of the support member of FIG. 6 taken along the line 7—7.

A radially outward, horizontal freedom of movement is provided for the air distributor inlet 14 along the radial delivery pipes 15 by the provision of sliding engagement of the support members 17 for the delivery pipes 15. As viewed in FIGS. 6 and 7, the support members 17 consist of pier structures having vertical struts 36 and angled crossmembers 37. The four struts in each pier converge and are affixed to a support plate 38. The support plate 38, in turn, carries a guide box 39 which encircles one of the radial delivery pipes 15. As indicated in FIG. 7, the guide box 39 does not provide any vertical or side movement for the pipe 15, but there is sufficient tolerance between the box and the pipe so that travel of the pipe along its axis is relatively unimpeded. An arrangement of two such support members 17 on each radial delivery pipe 15 is provided, as shown in FIG. 4.

The remaining inlets and outlets coming through the bottom head 12 are rigidly affixed thereto, but this rigidity is not critical because of the simple structure of these devices and because of the less critical nature of their placement in the fluidized bed.

Although the burner vessel of the present invention has been described and illustrated in simplified form, it will be understood a number of support devices are necessary to the operation of such a burner vessel. It will also be understood by one skilled in the art that certain obvious modifications from the described embodiment are possible, and these modifications are deemed to be within the scope of the invention which is set forth in the claims which follow.

What I claim is:

1. A burner vessel for supplying heated particulate to a reactor vessel wherein the burner vessel comprises an exterior shell, including a top and bottom head, a plurality of outlets for removing at least exhaust gases from the vessel, a plurality of inlets for supplying air and steam to an interior portion of the burner, means within said burner vessel for separating particulate from exhaust gases and a fluidized coke particle bed for combusting particulate at elevated temperatures, the improvement including:

(a) an air distributor inlet, including; a central vertical header, a plurality of radial delivery pipes connected to said header, a plurality of concentric ring delivery pipes which are in turn connected to said radial delivery pipes, a plurality of nozzles in said concentric delivery pipes for delivering air or a mixture of air and steam from said header to said fluidized bed of the burner vessel to support the combustion occurring in said bed, (b) support members affixed to an anterior surface of said bottom head for supporting said air distributor inlet in slideable contact with said radial delivery pipes to provide freedom of movement for said radial delivery pipes and therefore said air distributor inlet during thermal expansion and contraction which occurs during the combustion in said burner vessel, said support members being surrounded by refractory fill disposed in said bottom head, said refractory fill in said bottom head being covered with a cast refractory layer and reinforced with a metallic mesh which prevents ingress of coke particles to the refractory fill below the cast refractory layer, and (c) means defining a yieldable connection between said central vertical header and said bottom head to allow the vertical header to freely expand or contract axially with respect to said bottom head.

2. The invention of claim 1, wherein said vessel has an elliptical bottom head provided with a plurality of inlets and outlets therein for transporting air of said air and steam mixture through said bottom head.

3. The invention of claim 1, wherein the support members slidingly contact the radial delivery pipes so as to allow unrestrained radial thermal expansion and contraction of said entire air distributor inlet.

4. The invention of claim 1, wherein the concentric ring delivery pipes are of increased cross-sectional dimension relative to their placement outwardly from said central vertical header.

5. The invention of claim 1, wherein the concentric ring delivery pipes include a plurality of depending air nozzles directed downwardly into the fluidized bed.

6. The invention of claim 1, wherein said yieldable connection consists of bellows which provides freedom of movement on the vertical axis of the central vertical header.

7. The invention of claim 1, wherein the outlet for exhaust gases includes a separatory device therein for removing particulate from the exhaust gas.

8. The invention of claim 7, wherein said separatory device comprises at least one centrifugal cyclone separator.

9. The invention of claim 1, wherein the exterior shell of said burner vessel includes an elliptically shaped bottom head.

10. The invention of claim 9, wherein said refractory fill and said cast refractory layer thereon also provides support for said fluidized bed and provides horizontal stability to various inlets disposed in or supported by the bottom head.

11. A distributor in a regenerator of a fluid catalytic cracking unit, said regenerator for supplying catalyst particulate wherein the regenerator comprises an exterior shell, including a top and bottom head, a plurality of outlets for removing at least exhaust gases from the regenerator, a plurality of inlets for supplying air and steam to an interior portion of the regeneration, means within said regenerator for separating catalyst particulate from exhaust gases, and a fluidized catalyst bed for combusting coke coated upon said catalyst at elevated temperatures, the improvement including:

(a) an air distributor inlet, including; a central vertical header, a plurality of radial delivery pipes connected to said header, a plurality of concentric ring delivery pipes which are in turn connected to said radial delivery pipes, a plurality of nozzles in said concentric delivery pipes for delivering air or an air and steam mixture from said header to said fluidized bed of the regenerator to support the combustion occurring in said bed, (b) support members affixed to an anterior surface of said bottom head for supporting said air distributor inlet in slideable contact with said radial delivery pipes to provide freedom of movement for said radial delivery pipes and therefore said air distributor inlet during thermal expansion and contraction which occurs during the combustion in said regenerator, said support members being surrounded by refractory fill disposed in said bottom head, said refractory fill in said bottom head being covered with a cast refractory layer and reinforced with a metallic mesh which prevents ingress of cocke particles to the refractory fill below the cast refractory layer, and (c) means defining a yieldable connection between said central vertical header and said bottom head to allow the vertical header to freely expand or contract axially with respect to said bottom head.

* * * * *